May 31, 1960   E. G. PODOLAN ET AL   2,938,749
VEHICLE CLOSURE AND OPERATING MECHANISM THEREFOR
Filed Jan. 20, 1956   5 Sheets-Sheet 1

INVENTORS
Edward G. Podolan&
BY Clark E. Quinn
Paul Fitzpatrick
ATTORNEY

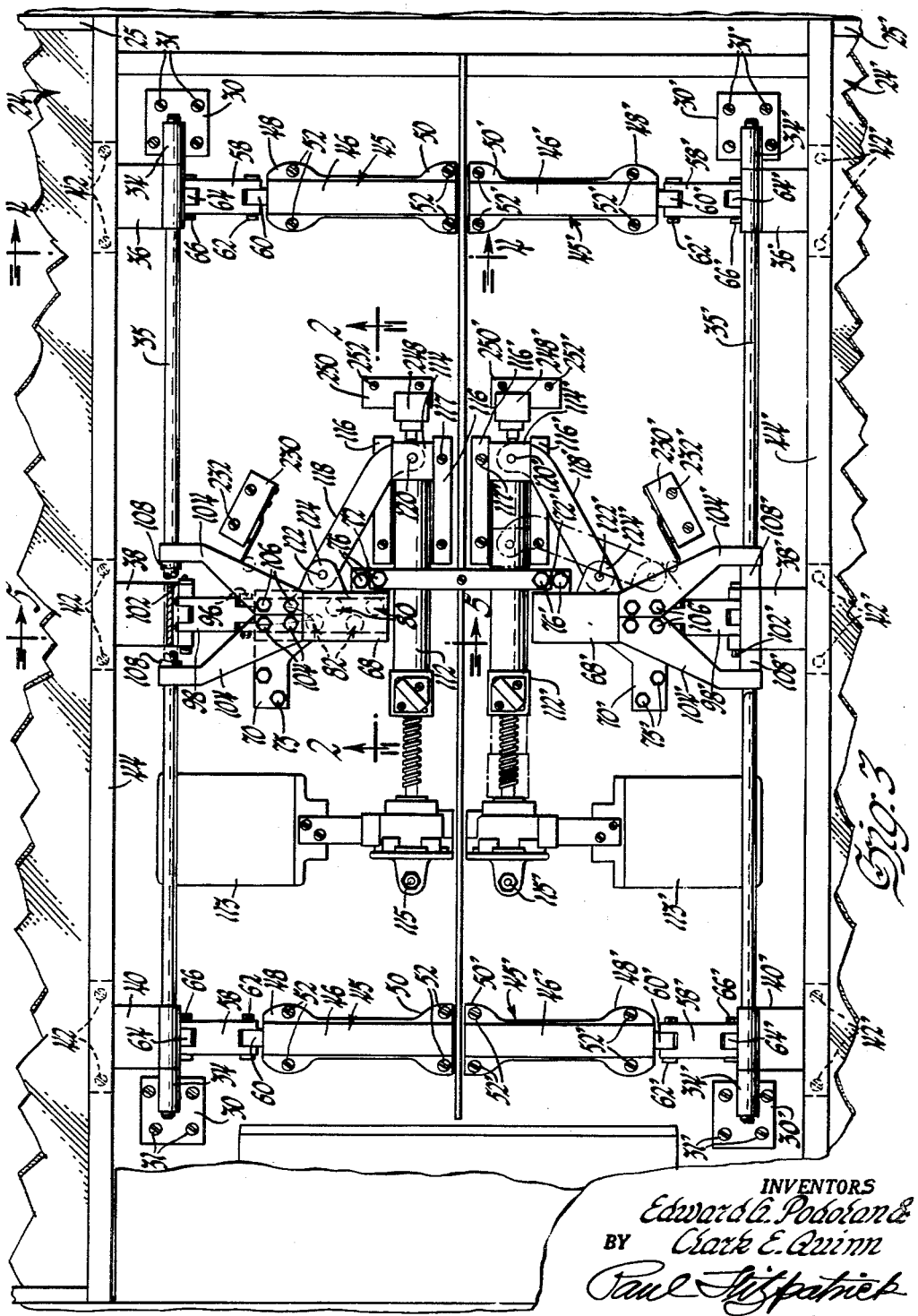

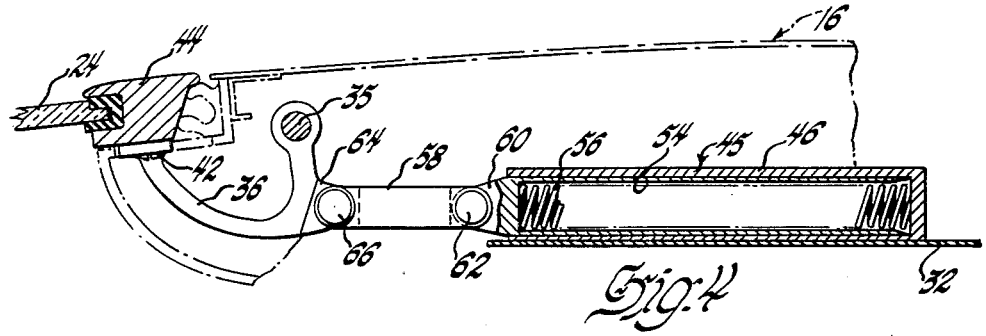
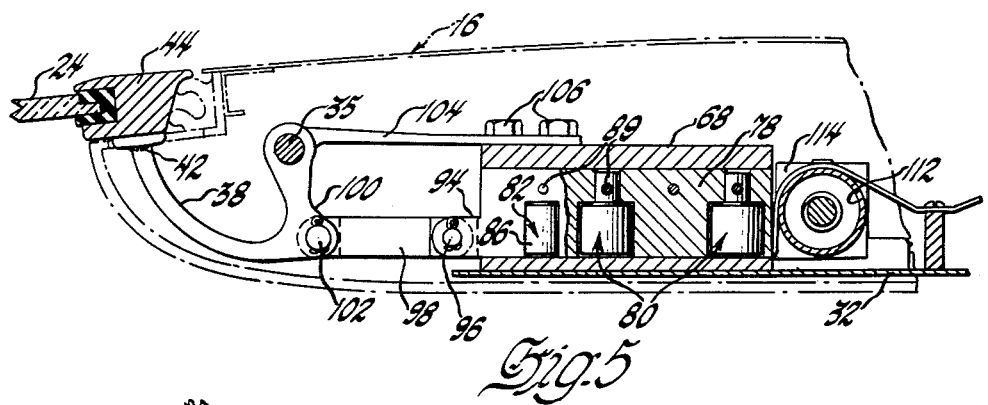
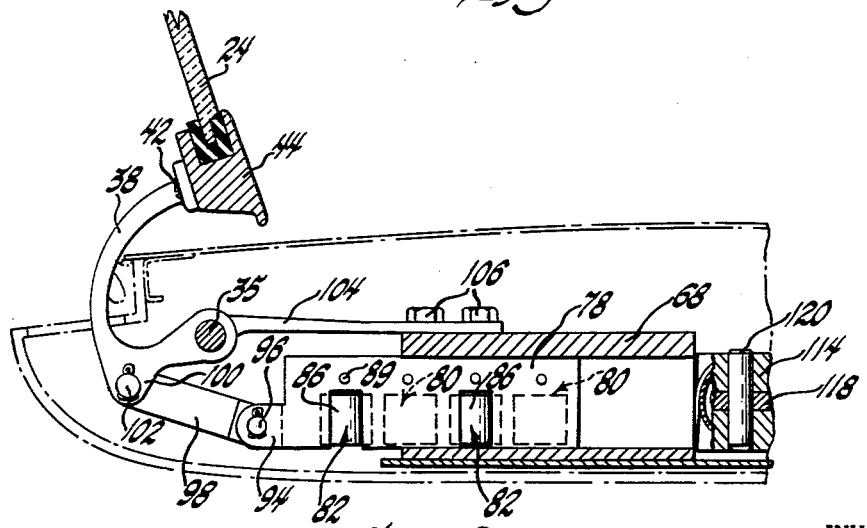

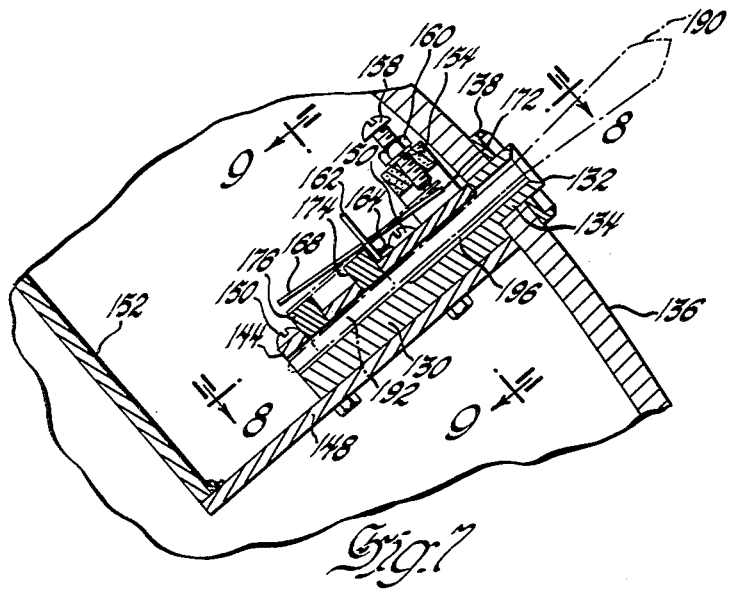
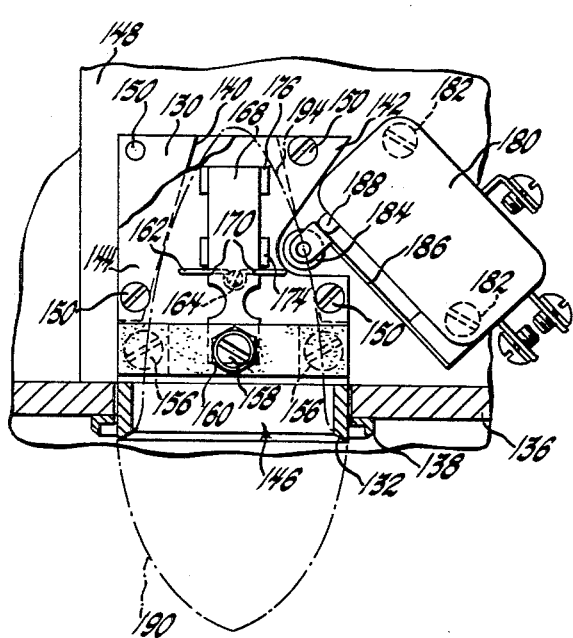
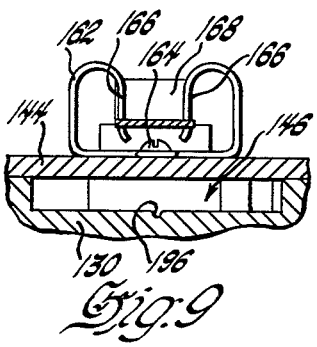

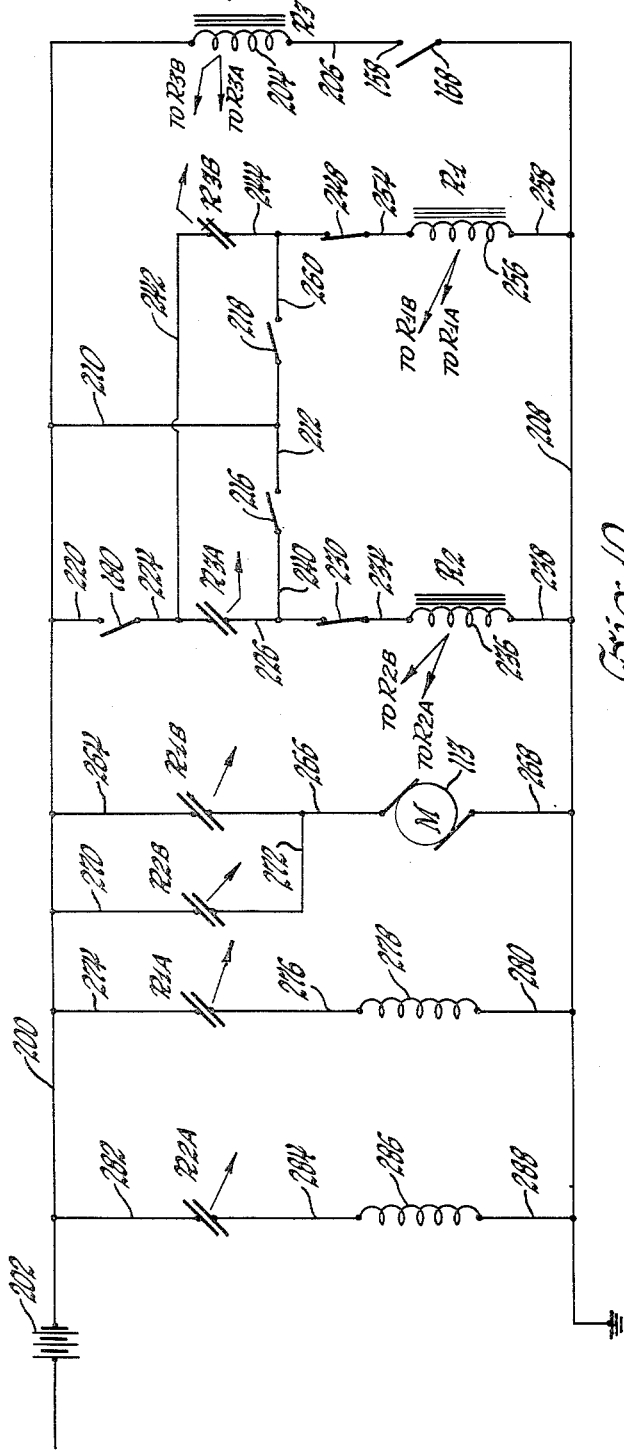

United States Patent Office 2,938,749
Patented May 31, 1960

2,938,749

VEHICLE CLOSURE AND OPERATING MECHANISM THEREFOR

Edward G. Podolan, St. Clair Shores, and Clark E. Quinn, Royal Oak, Mich., assignors to General Motors Corporation, Detroit, Mich., a corporation of Delaware Filed Jan. 20, 1956, Ser. No. 560,401

6 Claims. (Cl. 296—44)

This invention relates to vehicle body closures and more particularly to a roof door for vehicle bodies and the operating mechanism therefor.

The primary object of this invention is to provide an improved roof door for vehicle bodies. Another object of this invention is to provide an improved roof door for vehicle bodies which forms the upper part of a vehicle body door and is movable between open and closed positions for passenger entry and exit. A further object of this invention is to provide an improved roof door for vehicle bodies which forms the upper part of a vehicle door and is power operated for movement between open and closed positions for passenger entry and exit. Yet another object of this invention is to provide a new and improved power operating mechanism for a vehicle roof door movable to open and closed positions for passenger entry and exit and which includes a switch mechanism operated by a key mounting a permanent magnet.

These and other objects of this invention will be readily apparent from the following specification and drawings, in which:

Figure 3 is a top plan view of the operating mechanism for both vehicle roof doors;

Figure 4 is a sectional view taken on the plane indicated by line 4—4 of Figure 3;

Figure 5 is a sectional view taken on the plane indicated by line 5—5 of Figure 3;

Figure 6 is a view similar to Figure 5 showing a portion of the operating mechanism and the roof door in open position;

Figure 7 is a sectional view showing the switch mechanism controlling the operation of the power operating mechanism from the exterior of the body;

Figure 8 is a plan view of the switch mechanism of Figure 7 taken on the plane indicated by line 8—8;

Figure 9 is a sectional view taken on the plane indicated by line 9—9 of Figure 7; and Figure 10 is a circuit diagram.

Before proceeding with a description of the roof door and the power operating mechanism, it will be understood that one of these roof doors and the power operating mechanism therefor is provided for each side of the body and each is selectively and independently operable of the other. Since each of the roof doors and the operating mechanism therefor is of the same construction, only one such door and its operating mechanism will be described, with the same parts of the other door and the operating mechanism therefor being indicated by primed numerals.

Figure 1:
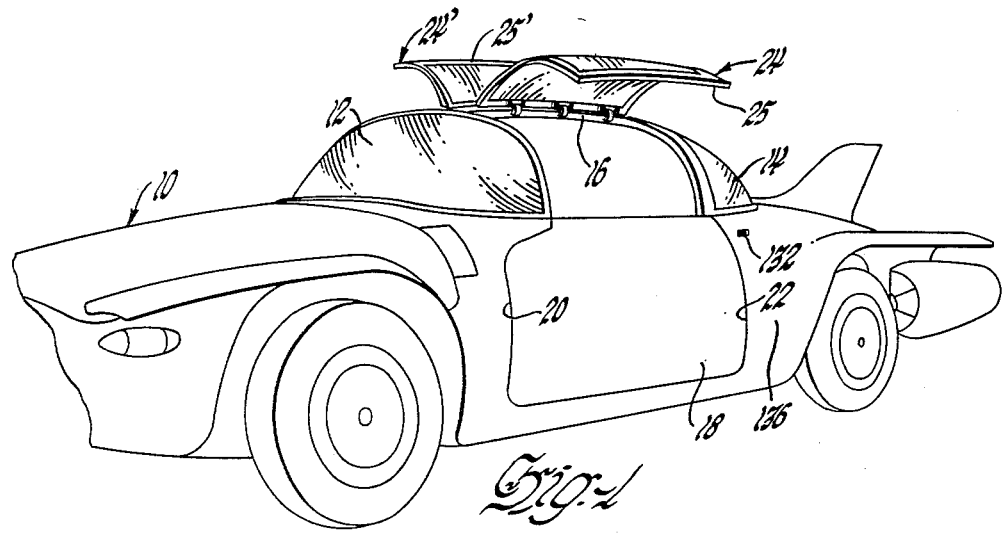
Figure 1 is a perspective view of a vehicle body embodying a pair of roof doors and the operating mechanism therefor according to this invention.

Referring now to Figure 1 of the drawings, a vehicle body 10 includes a windshield 12, a backlite 14, and a roof panel section 16 extending between the windshield and the backlite and secured thereto. A vehicle body door 18 is provided on either side of the body. Door 18 is hinged to the body at its forward edge 20 and latched to the body at its rearward edge 22. There are no exterior controls for the latch mechanism of door 18, all of the controls for the door being on the door inner panel. A roof door 24 is swingably mounted on each side of the roof panel 16 and is movable between an open position, as shown in Figure 1, and a closed position wherein the roof door seals against the upper edge of door 18 and the vehicle windshield and backlite. Each door includes a transparent panel shaped to follow the body contour and mounted within a suitable frame 25.

Referring now to Figures 2 through 6 of the drawings, the operating mechanism for one of the roof doors wil be described. Both operating mechanisms for the doors are housed within the roof panel 16 and are of the same construction. Therefore, only one such mechanism will be particularly described and the same parts of the other mechanism will be indicated by primed numerals. A hinge mounting bracket 30 is secured at 31 to the lower wall 32 of the roof panel section 16 adjacent the windshield and the backlite. Each hinge mounting bracket includes an upwardly extending apertured lug 34. A hinge rod 35 extends through the apertured lugs and is secured therein in a suitable manner to define a hinge axis for the roof door 24.

Three equally spaced gooseneck hinge arms 36, 38, and 40 are secured at 42 to the upper frame member 44 of the roof door frame 25 and are swingably mounted on hinge rod 35. Hinge arms 36 and 40 are resiliently biased to move the roof door to open position by means of plunger assemblies 45. Since each of the plunger assemblies is of the same construction, only one such assembly will be particularly described.

Referring now particularly to Figures 3 and 4 of the drawings, a cylindrically shaped housing 46 includes flanges 48 and 50 which are secured to the lower wall 32 of the roof panel at 52. A hollow plunger 54 is slidably mounted within housing 46. A compression spring 56 bears against the rear wall of housing 46 and the forward wall of plunger 54 to bias the plunger outwardly of the housing. A link 58 is bifurcated at each end thereof, with one end of the link receiving a lug 60 of plunger 54 which is pivoted therein at 62 and the other end of the link receiving a lug 64 of hinge arm 36 which is pivoted therein at 66. It can be seen that the compression springs 56 operate to continually bias plungers 54 outwardly of housings 46 so as to bias the hinge arms 36 and 40 about hinge rod 35 in a direction to move the roof door to open position and to hold the roof door in this position. Similarly, the roof door is held in closed position against the action of each of the compression springs.

Referring now to Figures 2, 3, 5, and 6, a guide 68 includes lateral flanges 70 and 72 and an open slot 73 in one side wall 74 thereof. Flange 70 is secured to the lower wall 32 of panel 16 at 75 and flange 72 is secured to the same wall at 76 to rigidly mount the guide on the roof panel. A block member 78 fits within guide 68 for linear movement into and out of the guide. In order to insure that the block member 78 moves inwardly and outwardly of guide 68 without binding and substantially normal to the hinge axis defined by rod 35, a number of rollers 80 and 82 are provided. Rollers 80 and 82 are staggered with respect to each other, with rollers 80 engaging side wall 74 of guide 68 and rollers 82 engaging the opposite side wall 83 of the guide.

Figure 2:
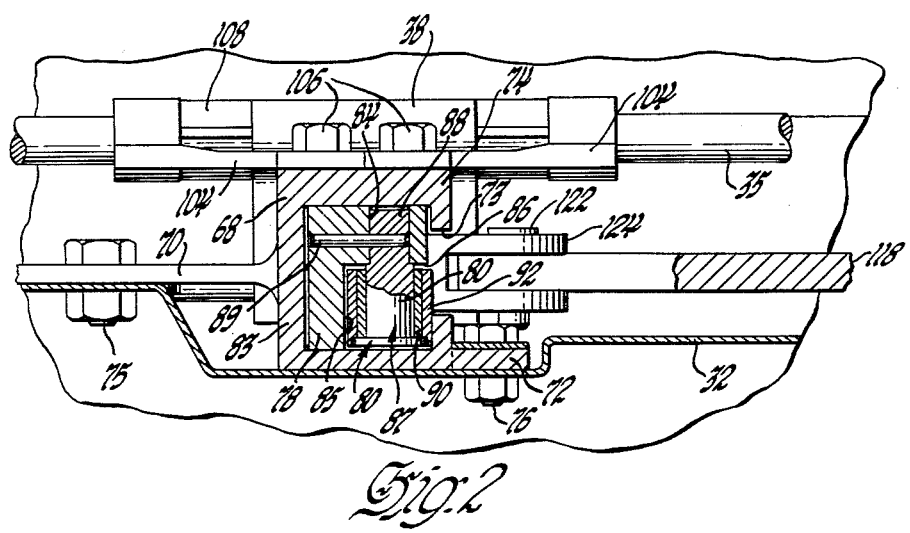
Figure 2 is a sectional view taken on the plane indicated by line 2—2 of Figure 3.

Since each roller is of the same construction only one such roller will be described with reference particularly to Figures 2 and 6. A shouldered bore in the block member 78 has an upper bore portion 84 of least diameter and a lower bore portion 85 of greater diameter. A portion of the wall of bore portion 85 opens to the side of the block member at 86. A stud 87 includes an upper shank portion 88 of least diameter which fits within bore portion 84 and is secured therein by a pin 89 to mount the stud within the shouldered bore. A plain bearing 90 fits on the lower shank portion of the stud and bears against the head of the stud to locate the bearing. An outer sleeve 92 is slidably mounted on bearing 90 and engages the head of the stud to locate the sleeve axially of the stud and the bearing. A portion of the sleeve extends outwardly through the opening 86 in the wall of bore portion 85 so as to engage the side wall of guide 68. As the block member 78 moves inwardly and outwardly of the guide, each sleeve 92 rolls along a respective wall of the guide and rotates relative to the bearing member 90.

Block member 78 includes a bifurcated portion 94 receiving a lug at one end of a link 98 which is pivoted therein at 96. The other end of link 98 is bifurcated and is received within spaced slots in a lug portion 100 of hinge arm 38. Link 98 is pivoted to hinge arm 38 at 102 to operatively secure the hinge arm to block member 78. A pair of angle brackets 104 are bolted at 106 to the upper wall of guide 68 and include apertured boss portions 108 which receive hinge rod 35 and bear against opposite sides of the center hinge arm 38 to aid in locating this hinge arm.

The block member 78 is power operated for movement inwardly and outwardly of guide 68 to move the roof door 24 to open and closed positions. The opening movement of the roof door is aided by the plunger assemblies 45 and the closing movement of the door is resisted by these plunger assemblies. The plunger assemblies also cooperate in holding the roof door in open position.

Referring now particularly to Figure 3 of the drawings, the power operating mechanism for the block member 78 will be described. A screw jack assembly 112 is driven by motor 113 and includes a bifurcated terminal block 114 at one end thereof. The other end of the screw jack is pivoted at 115 to the lower wall 32 of panel 16. A pair of guide blocks 116 secured at 117 to the lower wall 32 of the roof panel engage opposite sides of block 114 to insure that the block moves along a linear path which is substantially parallel to the hinge axis defined by hinge rod 35. A link 118 is pivoted at 120 at one end thereof within the bifurcated block 114 of the screw jack and the other end of the link is pivoted at 122 within a bifurcated lug 124 which extends laterally outwardly through the slot 73 in side wall 74 of guide 68 and is an integral part of the block member 78.

Figure 3 shows the position of the operating mechanism for the door when the door is in closed position. It can be seen that the screw jack assembly 112 is in its extended position and that link 118 is located adjacent the screw jack assembly. If it is desired to open the roof door, the screw jack assembly 112 is retracted to move pivot 120 along a linear path which is substantially parallel to the hinge axis defined by rod 35. This will cause link 118 to move pivot 122 along a linear path normal to the hinge axis defined by rod 35 as block member 78 moves outwardly from within guide 68 to move the roof door to open position by swinging movement of the center hinge arm 38 about the hinge rod. The opening movement of the roof door is aided by the plunger assemblies 45 as previously described. The position of link 118 and the screw jack assembly 112 in the open position of the roof door is indicated by dot-dash lines. It will be noted that in the open position of the roof door, the screw jack assembly 112 is in its retracted position and that link 118 has moved from its position adjacent the screw jack assembly to a position adjacent guide 68 and the movable block member 78.

If it is desired to close the roof door, the screw jack assembly 112 is extended to again move pivot 120 along a linear path substantially parallel to the hinge axis defined by rod 35. This will operate to move link 118 from its position adjacent guide 68 to a position adjacent the screw jack assembly as the link moves pivot 122 along its path normal to the hinge axis to move block member 78 inwardly within guide 68 and move the roof door to closed position. The roof door is moved to closed against the action of the plunger assemblies 45 as previously described.

The motor 113 of screw jack assembly 112 is operable from either the interior or the exterior of the body to move roof door 24 between open and closed positions. A switch mechanism on the same side of the body as roof door 24 is provided for operation of motor 113 from the exterior of the body. This switch mechanism is actuated by a key mounting a permanent magnet. It will be understood that a similar switch mechanism is provided on the other side of the body to operate motor 113' of screw jack assembly 112'.

The switch mechanism will be described with references to Figures 7, 8, and 9 of the drawings. A base plate 130 of insulating material includes a rectangularly shaped housing portion 132 which extends outwardly through a similarly shaped opening 134 in side wall 136 of the body. An escutcheon plate 138 is secured to the body around housing portion 132 of the base plate. As can be seen particularly in Figure 8, the base plate includes a tapered open channel 140 extending inwardly from the opening of housing portion 132 and having its greatest width immediately adjacent the opening of housing portion 132. A triangularly shaped cut out 142 in one side of the base plate extends inwardly within channel 140.

An upper plate 144 of conductive material fits on the base plate and bears against the upper wall of housing portion 132. Plate 144 closes channel 140 and defines a key slot 146 with the channel and housing portion 132 as can be seen in Figure 8. The upper plate 144 and the lower plate 130 are secured together and to a mounting plate 148 of insulating material by means of a number of bolts 150. Plate 148 is secured to the vehicle body panel 136 and to plate 152 of insulating material which is also secured to the body panel. The upper plate 144 includes a triangularly shaped cut out portion which is aligned with cut out portion 142 in the base plate 130.

An insulator bridge 154 is secured to the upper plate at 156 and mounts a contact screw 158 which is threaded in the bridge. The contact screw is adjustable and is held in adjusted position by a lock nut 160 which is threaded on the screw and bears against the upper surface of the bridge. A U-shaped thin wire spring 162 is secured to the upper plate at 164 and includes spaced terminal depending portions 166. A switch armature 168 of thin steel includes notches 170 on opposite sides thereof which are received by the terminal depending portions 166 of spring 162 to swingably mount the armature on the upper plate. One end of the armature fits beneath bridge 154 and mounts a contact button 172. The contact button is of a weight sufficient to bias the switch armature to a position wherein the contact button is out of engagement with the contact screw 158 as shown in Figure 7.

A pair of rectangularly shaped pole pieces 174 and 176 are mounted within similarly shaped openings in the upper plate 144 in spaced relationship to each other, with pole piece 174 being located immediately adjacent spring 162 and pole piece 176 being located adjacent the other end of the switch armature. As shown particularly in Figure 7, in the normal position of the switch armature, the armature is out of engagement with both of the pole pieces 174 and 176 and the contact button 172 is out of engagement with the contact screw 158.

A normally open micro switch 180 is secured to mounting plate 148 at 182. The micro switch includes a contact roller 184 which fits within cut out portion 142 in the base plate 130 and the upper plate and extends partially within key slot 146. The contact roller is mounted on a resilient arm 186 and engages the plunger contact 188 of the micro switch. The micro switch is normally open and is adapted to be closed by the contact roller 184 moving the plunger contact 188 inwardly within the switch.

The switch is actuated by a key mounting a permanent magnet. The key is of insulating material and is indicated schematically at 190 in Figures 7 and 8 of the drawings. The permanent magnet 192 is located at one end of the key. When the key is fully inserted within the key slot, the permanent magnet is positioned beneath both of the pole pieces 174 and 176 so that the magnet field attracts the switch armature into engagement with the pole pieces as indicated by dot-dash lines in Figure 7. When the switch armature swings to this position, contact button 172 will be moved into engagement with the contact screw 158 so as to complete a circuit from the upper plate 144 through the pole pieces 174 and 176, switch armature 168, contact 172, and the contact screw 158.

Insertion of the key within the key slot also closes the normally open micro switch 180 as one edge 194 of the key engages the contact roller 184 of the switch to move the plunger contact 188 inwardly within the switch. The upper plate 144 is electrically connected to one side of the circuit and the contact screw 158 is electrically connected to the other side of the circuit. The switch will not operate unless the permanent magnet 192 is located substantially across both pole pieces 174 and 176 so that the key must be fully inserted within the key slot 146 before the switch will be actuated. By thus locating the pole pieces, the switch will not be actuated unless the micro switch 180 is also simultaneously closed. A groove 196 in the base of channel 140 is adapted to receive a rib of key 190 to accurately locate the key within the key slot 146.

Figure 10 is a circuit diagram showing the circuit which controls motor 113 of screw jack assembly 112. A conductor 200 extends from a battery 202 to the coil 204 of a ratchet relay R3. Relay R3 alternately closes contacts R3A or contacts R3B being closed in the closed position of the roof door 24 and R3A being closed in the open position of the roof door. A conductor 206 extends from the coil 204 of relay R3 to the contact screw 158 and a conductor 208 extends from the switch armature 168 to ground. A conductor 210 extends from conductor 200 to conductor 212. Conductor 212 is connected to the contact of a normally open manually operated switch 216 and also the switch arm of a normally open manually operated switch 218. Switches 216 and 218 are mounted on an inner body panel on the same side of the body as roof door 24 and are adapted to be operated by the passenger or operator from within the body. Switch 216 is operated to open the roof door and switch 218 is operated to close the roof door. A conductor 220 extends from conductor 200 to the switch contact of the normally open micro switch 180 and a conductor 224 extends from the micro switch to one contact R3A of relay R3. A conductor 226 extends from the other contact R3A of relay R3 to the contact of a normally closed limit switch 230. Limit switch 230 is open only when the roof door 24 is in open position.

Referring now particularly to Figure 3 of the drawings, the normally closed limit switch 230 is mounted on panel 32 at 232. The switch is opened by the bifurcated lug portion 124 of block member 78 when the block member moves outwardly from within guide 68 as the roof door 24 moves to open position.

A conductor 234 extends from normally closed limit switch 230 to the coil 236 of relay R2 which alternately opens and closes both relay contacts R2A and R2B. A conductor 238 extends from the coil of relay R2 to conductor 208 which is grounded. A conductor 240 extends from conductor 226 to switch 216. A conductor 242 extends from conductor 224 to one contact R3B of relay R3 and a conductor 244 extends from the other contact R3B of relay R3 to the contact of a normally closed limit switch 248. Limit switch 248 is open only when roof door 24 is in closed position.

Referring now to Figure 3 of the drawings, limit switch 248 is secured to a mounting plate 250 secured to panel 32 at 252. This switch is opened by block 114 of screw jack assembly 112 in the closed position of the roof door and the extended position of the screw jack assembly.

A conductor 254 extends from the normally closed limit switch 248 to the coil 256 of relay R1 which alternately opens and closes both relay contacts R1A and R1B. A conductor 258 extends from the relay coil 256 to conductor 208 which is grounded. A conductor 260 extends from conductor 244 to the contact of switch 218.

A conductor 264 extends from conductor 200 to one contact R1B of relay R1 and a conductor 266 extends from the other contact R1B to the armature winding of the reversible motor 113 which drives the screw jack assembly 112. A conductor 268 extends from the armature winding to conductor 208 which is grounded. A conductor 270 extends from conductor 200 to one contact R2B of relay R2 and a conductor 272 extends from the other contact R2B to conductor 266. A conductor 274 extends from conductor 200 to one contact R1A of relay R1 and a conductor 276 extends from the other contact R1A to the field winding 278 of motor 113 which operates the motor in a direction to extend the screw jack assembly 112 and move the roof door 24 to closed position. The other side of field winding 278 is connected to conductor 208 by conductor 280. A conductor 282 extends from conductor 200 to one contact R2A of relay R2. A conductor 284 extends from the other contact R2A of the relay to the field winding 286 of motor 113 which operates the motor in a direction to retract the screw jack assembly and move roof door 24 to open position. The other side of field winding 286 is connected to conductor 288.

The circuit is shown with the roof door 24 in closed position and the passenger or operator of the vehicle being outside of the vehicle. Assuming now that the passenger or operator desires to open roof door 24 and door 18 to gain access to the body, he inserts key 190 within key slot 146 to close the normally open micro switch 180 and to complete the circuit through the switch armature 168, as previously described.

Closing of the circuit through the switch armature 168 will complete a circuit from conductor 200 through the coil 204 of relay R3 and through conductors 206 and 208 to ground. This will energize relay R3 so that the ratchet of the relay will operate to open contacts R3B and close contacts R3A. A circuit will then be completed from conductor 200 through conductor 220, the normally open micro switch 180 which is now closed, conductor 224, the closed contacts R3A of relay R3, conductor 226, the normally closed limit switch 230, conductor 234, the coil 236 of relay R2, and to ground through conductors 238 and 208. This will energize relay R2 so as to close both relay contacts R2A and R2B to operate the reversible motor 113 of the screw jack assembly 112 and retract the screw jack to move the roof door to open position.

The circuit through the field winding 286 of the reversible motor 113 is completed through conductor 282, the closed relay contacts R2A, conductor 284, field winding 286, conductor 288, and to ground through conductor 208. The circuit through the armature winding of the motor is completed through conductor 270, the closed relay contacts R2B, conductor 272, conductor 266, the armature winding of the motor and to ground through conductors 268 and 208. When the roof door reaches its open position, the bifurcated lug 124 of block member 78 will engage the normally closed micro switch 230 to open this switch and deenergize relay R2 so as to stop the motor 113 of the screw jack assembly. The passenger or operator then withdraws key 190 and reaches inside of the body to operate the door locking mechanism for door 18 so as to open the door.

After the passenger or operator has entered the body and closed door 18, he closes switch 218. This will complete a circuit from conductor 200 through conductor 210, conductor 212, switch 218, conductor 260, conductor 244, the normally closed limit switch 248, conductor 254, the coil 256 of relay R1 and to ground through conductors 258 and 208. This will energize relay R1 so as to close relay contacts R1A and R1B and operate the reversible motor 113 of the screw jack assembly 112 to move the roof door 24 to closed position. The circuit through the field winding of the motor is completed through conductor 274, the closed contacts R1A, conductor 276, the field winding 278, and to ground through conductors 280 and 208. The circuit through the armature winding of the motor is completed through conductor 264, the closed contacts R1B, conductors 268 and 208. When the roof door is moved to closed position, the screw jack assembly is extended as previously described and the block 114 of the assembly will engage the normally closed micro switch 248 to open this switch and deenergize relay R1 to stop motor 113. The driver or passenger then opens switch 218.

Assuming that the driver or passenger desires to leave the vehicle he closes the switch 216. This will complete a circuit from conductor 200 through conductor 210, conductor 212, switch 216, conductor 240, conductor 226, the normally closed switch 230, conductor 234, the coil 236 of relay R2 and to ground through conductors 238 and 208. This will energize the coil of relay R2 so as to close both contacts R2A and R2B and to operate the motor 113 of the screw jack assembly as previously described to open the roof door. When the roof door is moved to open position, limit switch 230 will be opened as previously described to deenergize relay R2 and stop motor 113. The driver or passenger then opens door 18 and leaves the vehicle.

After the driver leaves the vehicle, he closes door 18 inserts the key 190 within the key slot 146. This will close microswitch 180 and complete a circuit through relay R3 as previously described. Relay R3 will then be energized to open relay contacts R3A and close relay contacts R3B. This will complete a circuit from conductor 200 through conductor 220, micro switch 180, conductor 224, conductor 242, relay contacts R3B, conductor 244, normally closed limit switch 248, conductor 254, the coil 256 of relay R1, and to ground through conductors 258 and 208. This will energize relay R1 to close relay contacts R1A and R1B and complete a circuit through the armature winding and the field winding of the motor, as previously described, and operate the motor to move the roof door to closed position. When the roof door moves to closed position, the normally closed limit switch 248 is opened to deenergize relay R1 and stop the motor of the screw jack assembly. The operator then withdraws the key from the key slot to open micro switch 180 and open the circuit through the switch armature 168 so that the circuit is then readied for another cycle of operation.

We claim:

1. The combination comprising, a vehicle body having an opening therein, a closure member, hinge means on said body swingably mounting said closure member thereon for movement between open and closed positions with respect to said opening, a pair of linear guide means on said body disposed transversely of each other to define a pair of transversely related linear guide paths, an operating member movable along one of said linear guide means, an operated member movable along the other of said linear guide means and being operatively secured to said closure member for movement of said closure member between said open and closed positions upon movement of said operating member, and a link pivotally interconnecting said operated and said operating member, said link being movable from a first position generally longitudinally adjacent to one of said linear guide means and generally transversely of the other of said guide means when said closure member is in one of said positions to a second position generally longitudinally adjacent to the other of said linear guide means and generally transversely of said one of said linear guide means when said closure member is in the other of said positions to thereby move said closure member between said positions.

2. In combination with a vehicle body having an opening therein, a closure member, hinge means on said body defining a hinge axis and swingably mounting said closure member on said body for movement between open and closed positions with respect to said opening, a plurality of spaced first linear guide means on said body defining linear guide paths located in transverse relationship to said hinge axis, a second linear guide means on said body disposed transversely of one of said first linear guide means to define a pair of transversely related linear guide paths therewith, an operating member movable along said second linear guide means, an operated member movable along said one of said first linear guide means and being operatively secured to said closure member for movement of said closure member to open and closed positions upon movement of said operating member, a link pivotally interconnecting said operated and operating members, said link being movable from a first position generally longitudinally adjacent to said one of said first linear guide means and generally transversely of said second linear guide means when said closure member is in one of said positions to a second position generally longitudinally adjacent to said second linear guide means and generally transversely of said one of said first linear guide means when said closure member is in the other of said positions to thereby move said closure member between said positions, guided means movable along each of the other of said first linear guide means and operatively connected to said closure member, and means biasing said guided means along said each of said other of said guide means toward said hinge axis to bias said closure member to open position.

3. In combination with a vehicle body having an opening therein, a closure member, hinge means on said body defining a hinge axis and swingably mounting said closure member on said body for movement between open and closed positions with respect to said opening, a plurality of first linear guide means on said body disposed in transverse relationship to said hinge axis, a second linear guide means on said body disposed transversely of one of said first linear guide means to define a pair of transversely related linear guide paths therewith, an operating member movable along said second linear guide means, an operated member movable along said one of said first linear guide means and being operatively secured to said closure member for movement of said closure member to open and closed positions upon movement of said operating member, a link pivotally interconnecting said operated and operating members, said link being movable from a first position generally longitudinally adjacent to said one of said first linear guide means and generally transversely of said second linear guide means when said closure member is in open position to a second position generally longitudinally adjacent to said second linear guide means and generally transversely of said one of said first linear guide means when said closure member is in closed position to thereby move said closure member between said positions, guided means movable along each of the other of said first linear guide means and operatively connected to said closure member, and means biasing said guided means along said each of said other of said first guide means toward said hinge axis to bias said closure member to open position.

4. The combination comprising, a vehicle body including a windshield and a backlite located in spaced relationship to each other, a door swingably mounted on said body and generally disposed between said windshield and backlite, a body roof panel interconnecting said windshield and backlite and defining a body opening between said windshield and backlite with the upper edge portion of said door, hinge means on said panel, a closure member secured to said hinge means for swinging movement between open and closed positions with respect to the upper edge portion of said door, a pair of linear guide means on said panel disposed transversely of each other to define a pair of transversely related linear guide paths, an operating member movable along one of said linear guide means, an operated member movable along the other of said linear guide means and being operatively secured to said closure member for movement of said closure member between said open and closed positions upon movement of said operating member, and a link pivotally interconnecting said operated and operating member, said link being movable from a first position generally longitudinally adjacent to one of said linear guide means and generally transversely of the other of said linear guide means when said closure member is in one of said positions to a second position generally longitudinally adjacent to the other of said linear guide means and generally transversely of said one of said linear guide means when said closure member is in the other of said positions to thereby move said closure member between said positions.

5. The combination comprising, a vehicle body including a windshield and a backlite located in spaced relationship to each other, a door swingably mounted on said body and generally disposed between said windshield and backlite, a body roof panel interconnecting said windshield and backlite and defining a body opening between said windshield and backlite with the upper edge portion of said door, hinge means on said panel, a closure member secured to said hinge means for swinging movement between open and closed positions with respect to the upper edge portion of said door, a pair of linear guides on said panel, one being disposed transversely thereof and the other being disposed longitudinally thereof to define transversely related paths, an operating member movable along said longitudinally disposed guide, an operated member movable along said transversely disposed linear guide and being operatively secured to said closure member for movement of said member between said open and closed positions upon movement of said operating member, and a link pivotally interconnecting said operated and operating members, said link being movable from a first position generally longitudinally adjacent to said longitudinally disposed guide and generally transversely of said transversely disposed guide when said closure member is in closed position to a second position generally longitudinally adjacent to said transversely disposed guide and generally transversely of said longitudinally disposed guide when said closure member is in open position to thereby move said closure member between said positions.

6. The combination comprising, a vehicle body including a windshield and a backlite located in spaced relationship to each other, a door swingably mounted on said body and generally disposed between said windshield and backlite, a body roof panel interconnecting said windshield and backlite and defining a body opening between said windshield and backlite with the upper edge portion of said door, hinge means on said panel defining a hinge axis, a body closure member secured to said hinge means for swinging movement between open and closed positions with respect to the upper edge portion of said door, a plurality of spaced first linear guides on said panel disposed in transverse relationship to said hinge axis, a second linear guide disposed transversely of one of said first linear guides, an operating member movable along said second linear guide, an operated member movable along said one of said first linear guides and being operatively secured to said closure member for movement of said closure member between said open and closed positions upon movement of said operating member, power actuating means mounted on said body panel for operating said operating member, a link pivotally interconnecting said operated and operating member, said link being movable from a first position generally longitudinally adjacent to said second guide and generally transversely of said one of said first linear guides when said closure member is in closed position to a second position generally longitudinally adjacent to said one of said first linear guides and generally transversely of said second linear guides when said closure member is in open position to thereby move said closure member between said positions, guided means movable along each of the other of said first guides, and compression spring means seated on said other of each of said first guides and said guided means for biasing said guided means toward said hinge axis to bias said closure member to open position.

References Cited in the file of this patent

UNITED STATES PATENTS

| | | |
|---|---|---|
| 700,812 | Peyton | May 27, 1902 |
| 2,141,298 | Heinz | Dec. 27, 1938 |
| 2,256,613 | Forman et al. | Sept. 23, 1941 |
| 2,371,336 | Levon | Mar. 13, 1945 |
| 2,541,288 | Rice | Feb. 13, 1951 |
| 2,551,054 | Sanmori | May 1, 1951 |
| 2,566,017 | Cooley | Aug. 28, 1951 |
| 2,757,554 | Niedhammer et al. | Aug. 7, 1956 |